(12) United States Patent
Bellamkonda et al.

(10) Patent No.: US 7,730,055 B2
(45) Date of Patent: Jun. 1, 2010

(54) EFFICIENT HASH BASED FULL-OUTER JOIN

(75) Inventors: Srikanth Bellamkonda, Mountain View, CA (US); Benoit Dageville, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 153 days.

(21) Appl. No.: 12/144,074

(22) Filed: Jun. 23, 2008

(65) Prior Publication Data

US 2009/0119247 A1    May 7, 2009

(51) Int. Cl.
*G06F 17/30* (2006.01)
(52) U.S. Cl. .................... 707/714; 707/802
(58) Field of Classification Search .............. None
See application file for complete search history.

(56) References Cited

U.S. PATENT DOCUMENTS

| | | | |
|---|---|---|---|
| 5,557,791 A * | 9/1996 | Cheng et al. ........... | 707/2 |
| 6,253,197 B1 * | 6/2001 | Lindsay et al. ......... | 707/3 |
| 7,043,494 B1 | 5/2006 | Joshi et al. | |
| 7,478,080 B2 * | 1/2009 | Pirahesh et al. ........ | 707/2 |
| 2002/0099691 A1 | 7/2002 | Lore et al. | |
| 2004/0172400 A1 * | 9/2004 | Zarom et al. .......... | 707/100 |
| 2004/0199516 A1 | 10/2004 | Thames et al. | |
| 2007/0083491 A1 | 4/2007 | Walmsley et al. | |

OTHER PUBLICATIONS

Graefe et al. ("Hash joins and hash teams in Microsoft SQL server", 1998-1999).*
Silberschatz et al. ("Database System Concept", Chapter 13—"Query Processing", 2006).*
Alexander Chigrik, "SQL Server 7.0: Hash Joins," Sep. 7, 2000, www.databasejournal.com/features/mssql/article.php/a443301 p. 1-4.
Oracle8i Data Warehousing Guide, Release 2 (8.1.6), Part No. A76994-01, "Parallelism and Partitioning," Dec. 1999, 17 pages.

* cited by examiner

*Primary Examiner*—Neveen Abel Jalil
*Assistant Examiner*—Son T Hoang
(74) *Attorney, Agent, or Firm*—Hickman Palermo Truong & Becker LLP (57) ABSTRACT

In a database system, a full outer join is computed using a hash-based join.

16 Claims, 7 Drawing Sheets

EFFICIENT HASH BASED FULL-OUTER JOIN

FIELD OF THE INVENTION

The present invention relates to database systems, and in particular, to optimization of queries executed by a database system.

BACKGROUND

Relational and object-relational database management systems store information in tables of rows in a database. To retrieve data, queries that request data are submitted to a database server, which computes the queries and returns the data requested.

Queries submitted to the database server must conform to the syntactical rules of a particular query language. One popular query language, known as the Structured Query Language (SQL), provides users a variety of ways to specify information to be retrieved.

A query submitted to a database server is evaluated by a query optimizer. Based on the evaluation, the query optimizer generates an execution plan that defines operations for executing the query. Typically, the query optimizer generates an execution plan optimized for efficient execution. The optimized execution plan may be based on a rewrite of the query.

A query may specify a full outer join operation based on join condition between two tables, a left table and a right table. A full outer join joins every row in the left table with every row in the right table that satisfies the join condition. A full outer join also returns a row for each row in the left table that did not satisfy the join condition with any row in the right table, and returns a row for any row in the right table that did not satisfy the join condition with any row in the left table.

The following tables are used to illustrate a full outer join.

TABLE EMP

| ROW # | DEPTNO | DNAME |
|---|---|---|
| 1 | 10 | SALES |
| 2 | 30 | MARKET |

TABLE DEPT

| ROW # | EMPNO | ENAME | DEPTNO |
|---|---|---|---|
| 1 | 100 | ALLEN | 10 |
| 2 | 101 | CLARK | 20 |

A full outer join between left table DEPT and right table EMP, based on an equijoin join condition involving columns DEPTNO in DEPT and DEPTNO in EMP, returns the following result set.

| ROW # | EMPNO | ENAME | EMP.DEPTNO | DEPT.DEPTNO | DNAME |
|---|---|---|---|---|---|
| 1 | 100 | ALLEN | 10 | 10 | SALES |
| 2 | 101 | CLARK | 20 | NULL | NULL |
| 3 | NULL | NULL | 30 | 30 | MARKET |

In the result set, row 1 represents a join between row 1 of EMP and row 1 of DEPT. Row 2 is a "right" outer join row because it was returned for a row which did not satisfy the join condition with any row from the left table. Row 2 in particular represents row 2 of EMP. Note the columns of the left table contain NULL. In this case, DEPT.DEPTNO and DNAME of table DEPT contains NULL.

Row 3 is a "left" outer join row for row 2 in table DEPT, which did not match any row from right table EMP.

Described herein are techniques for efficiently computing full outer joins between tables. The term table refers generally to any set of rows or tuples such as those stored in a database table or computed for an expression, such as a query or subquery. For example, the rows in the result set above can be referred to as a table.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are techniques for using a hash-based join operation to compute a full outer join between tables based on an equijoin condition. Before describing in detail the hash-based join operation, it useful to describe an operational environment according to an embodiment of the present invention.

Illustrative Operational Environment

A query optimizer within a database server (not shown) is used to implement an embodiment of the present invention. Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command may be in the form of a database statement. For the database server to process the database statements, the database statements must conform to a database language supported by the database server. One non-limiting database language supported by many database servers is SQL, including proprietary forms of SQL supported by such database servers as Oracle, (e.g. Oracle Database 10g). SQL data definition language ("DDL") instructions are issued to a database server to create or configure database objects, such as tables, views, or complex types.

Query Optimizer and Execution Plans

A query optimizer receives a query statement and generates one or more different candidate execution plans for a query, which are evaluated by the query optimizer to determine which execution plan should be used to compute the query.

Execution plans may be represented by a graph of interlinked nodes, referred to herein as operators, that each corresponds to a step of an execution plan, referred to herein as an execution plan operation. The hierarchy of the graphs (i.e., directed tree) represents the order in which the execution plan operations are performed and how data flows between each of the execution plan operations. An execution plan operator generates a set of rows (which may be referred to as a table) as output and execution plan operations include, for example, a table scan, an index scan, sort-merge join, nested-loop join, filter, and importantly, a full outer join.

A query optimizer may optimize a query by transforming the query. In general, transforming a query involves rewriting a query into another semantically equivalent query that should produce the same result and that can potentially be executed more efficiently, i.e. one for which a potentially more efficient and less costly execution plan can be generated. Examples of query transformation include view merging, subquery unnesting, predicate move-around and push-down, common subexpression elimination, outer-to-inner join conversion, materialized view rewrite, and star transformation.

Hash-Based Join for Full Outer Join Overview and Data Structures

According to an embodiment of the present invention, a hash-based join is used to compute a full outer join in four phases: 1) build phase 2) hybrid phase, 3) full partition join phase, and 4) piece-wise partition join. In the build phase, rows from the left table are divided into partitions, which are used in the latter phases.

Figure 1:
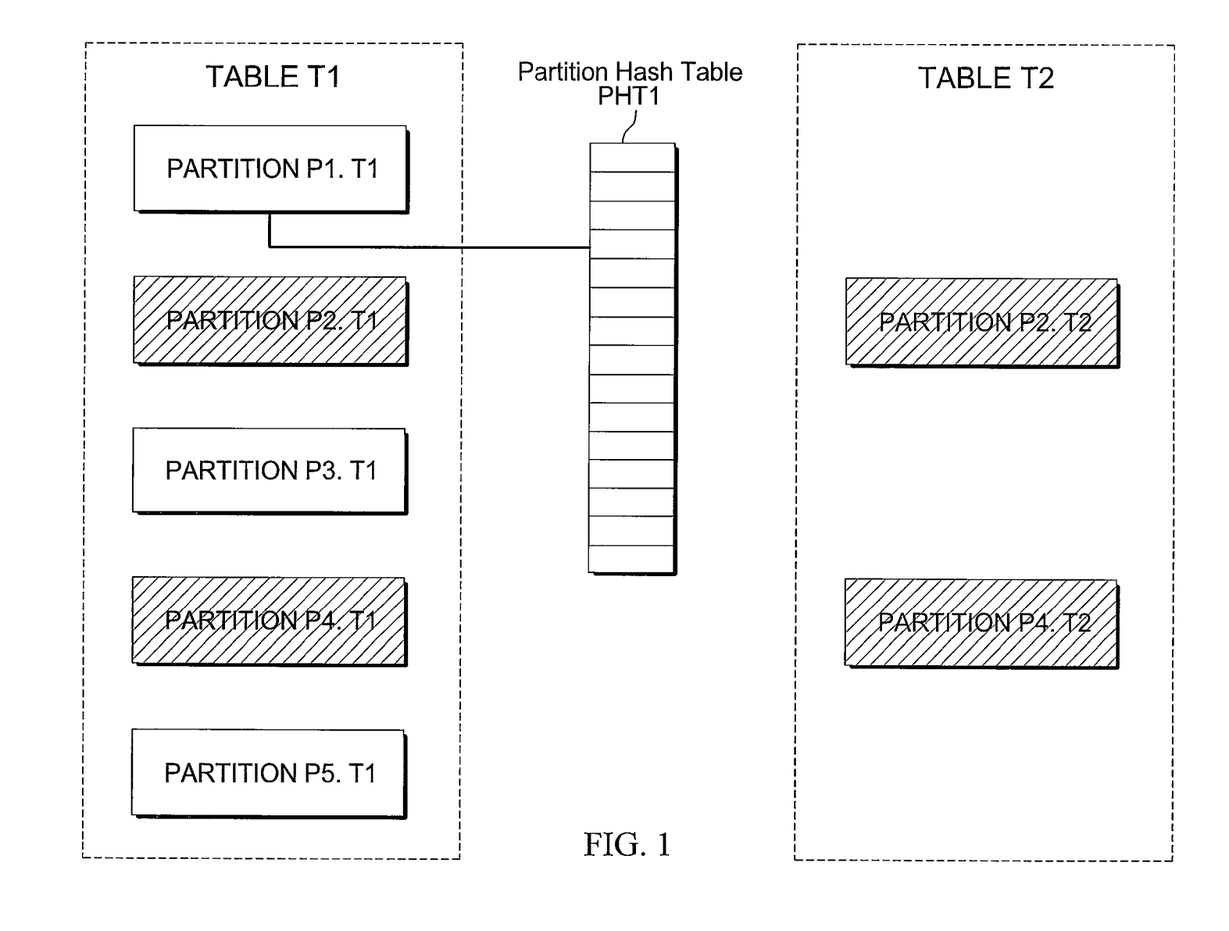
FIG. 1 is a diagram depicting data structures used in a hash-based join operation according to an embodiment of the present invention.

FIG. 1 shows structures created in the build phase, and are used to illustrate an embodiment of the present invention. Referring to FIG. 1, during the build phase, rows from left table T1 are read and stored in one of a number of left table partitions. The number of partitions may vary in an embodiment. In the current example, there are five left table partitions P1.T1, P2.T1, P3.T1, P4.T1, and P5.T1.

Which partition a left table row belongs is determined by a partitioning procedure, such as range partitioning or hash partitioning using a partition hash function. The partitioning is performed such that rows with the same value in a join column of the join condition belong to the same partition. For example, for a particular left table row, a partition hash function is applied to the join column of the left table to determine which partition the row belongs. All rows that evaluate to the same partition hash function value belong to and are stored in the same partition.

Partitions may be stored in-memory (i.e. in volatile memory, virtual memory) or stored persistently, when, for example, available memory requires spilling portions of the partitions onto disk. For example, a partition may be comprised of data blocks that hold rows. The data blocks may be stored in-memory, stored persistently, or both. In fact, many aspects of the hash-based join described in herein are designed to handle scenarios that occur when not all partitions can be simultaneously stored in and processed while in-memory.

Hybrid Phase

In the beginning of the hybrid phase, a determination is made of how many of the left table partitions may be completely stored in memory to perform a hash-based join. The determination may be based on various memory constraints. In the current example, it is determined that three partitions may be loaded, which are left table partitions P1.T1, P3.T1, and P5.T1.

The other left table partitions P1.T2 and P4.T1 are referred to herein as spilled, because the partitions may not be retained in-memory but may instead be stored persistently. Spilled partitions are highlighted by shading, as indicated in FIG. 1.

In-memory partitions indexed by a hash table are referred to as hashed in-memory partitions, or hashed partitions. As explained in greater detail, at various stages, left table rows or right table rows are stored in the hashed in-memory partitions.

For the rows in hashed in-memory partitions P1.T1, P3.T1, and P5.T1, a hash table PHT1 is built. Each entry in the hash table corresponds to hash function value, and contains a entry for each row in the hashed in-memory partitions whose join column value evaluates (when applied to the hash function value) to the hash function value. According to an embodiment, each entry is a hash value and a pointer to the row in the in-memory partition, or a hash value and a linked list of pointers, each pointer pointing to a row in an in-memory partition.

Figure 2:
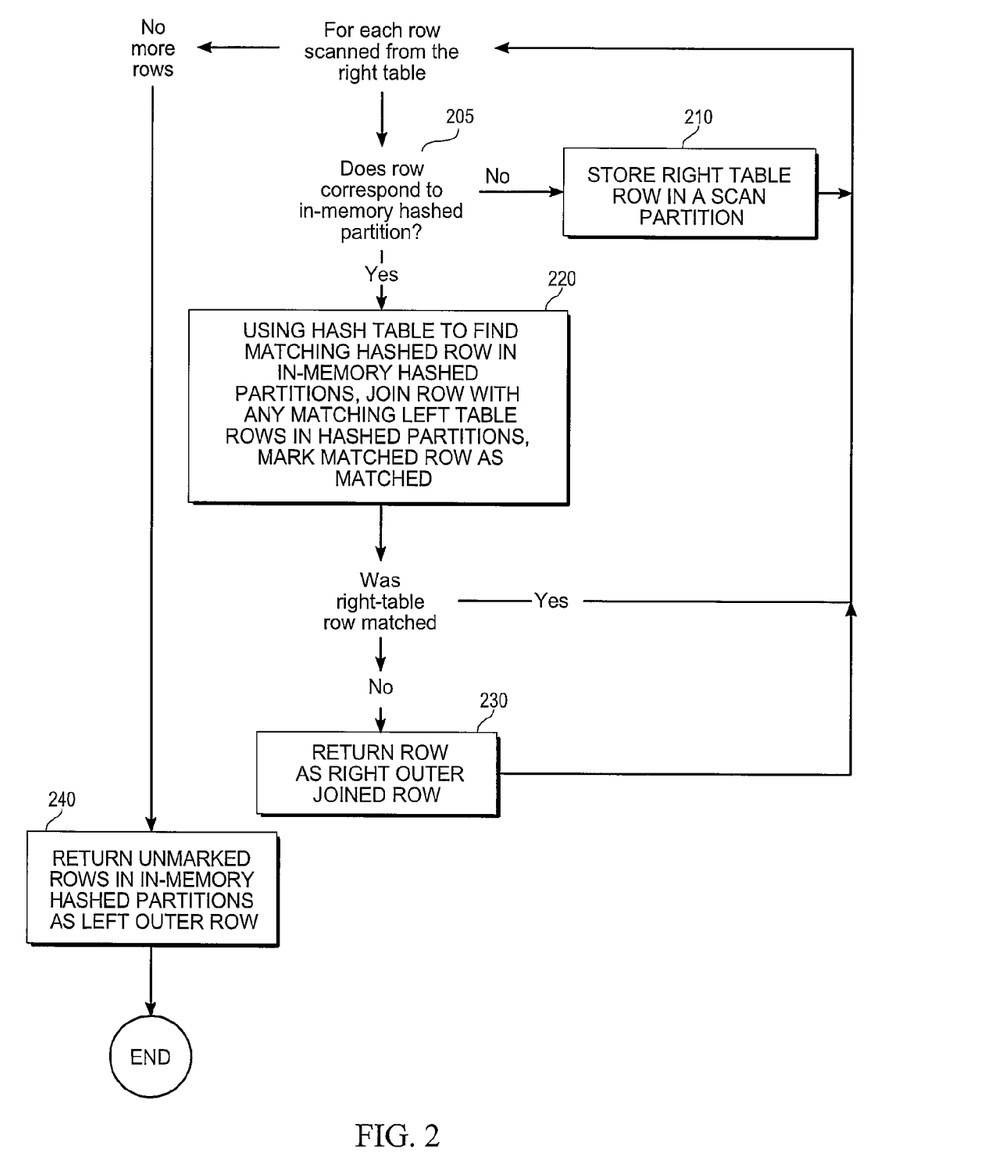
FIG. 2 is a flow chart depicting a procedure used during a hash-based join operation according to an embodiment of the present invention.

Once the hash table PHT1 is constructed, a hash-based join is performed between the left table rows in the hashed in-memory partitions and the right table rows from table T2. FIG. 2 shows such a procedure for performing a hash-based join between rows in the hashed in-memory partitions and the rows scanned from the right table T2.

Referring to FIG. 2, all the rows from right table T2 are scanned. For each row scanned, it is determined (205) whether the row corresponds to a hashed in-memory partition. The determination is made by applying the partition procedure to the join column value of the right table rows. If the partition procedure associates the value with a hashed in-memory partition, the right table row corresponds to a hashed in-memory partition.

If the right table row does not correspond to a hashed in-memory partition then, it is stored in a scan right table partition according to the partitioning procedure (210). The scan right table partition corresponds to one of the spilled left-table partitions. The rows in these partitions are hash joined at another stage. In the current example, FIG. 1 shows scanned right table partitions P2.T2 and P4.T2, which correspond to spilled left table partitions P2.T1 and P4.T1.

If the right table row corresponds to one of the hashed in-memory partitions, then the hash table is probed to determine the inner join rows (220). Specifically, using the hash table PHT1, it is determined which rows in the hashed in-memory partitions match the right table row, that is, have a join column key value that matches that of the right table row. For each matching left table row, the left table row is joined with the right table row to generate and return an inner joined row. The left table row is marked as having been joined to a right table row.

A right table row may not match any left table row in the hashed in-memory partitions. If it is determined (230) that that a right table row has not been matched to any left table row in the hashed in-memory partitions, then a right outer joined row for right table row is generated and returned.

Once all rows have been scanned and processed as above, then left outer join rows are generated (240). Specifically, a left outer join row is generated and returned for each unmarked left table row in the hashed in-memory partition, that is, for each left table row not marked as having been joined with a right table row.

Joining Spilled Partition that can Fit in Memory

The next phase is the full partition join phase, in which the rows in an entire spilled left table partition and scanned right table partition may be joined. If for a pair of a corresponding left table partition and scanned right table partition, one of the partitions may be completely loaded into available memory, that partition is loaded into memory as a hashed in-memory partition and then hash joined with the other partition. Partitions are corresponding when according to the partitioning procedure the partitions hold rows having the same values in the respective join columns. For example, P2.T1 and P2.T2 comprise a pair of corresponding partitions. If P2.T2 may be loaded into available memory, it will be loaded in in-memory as a hashed in-memory partition. The other partition, in this case P2.T1, is referred to as the scan partition.

Figure 3:
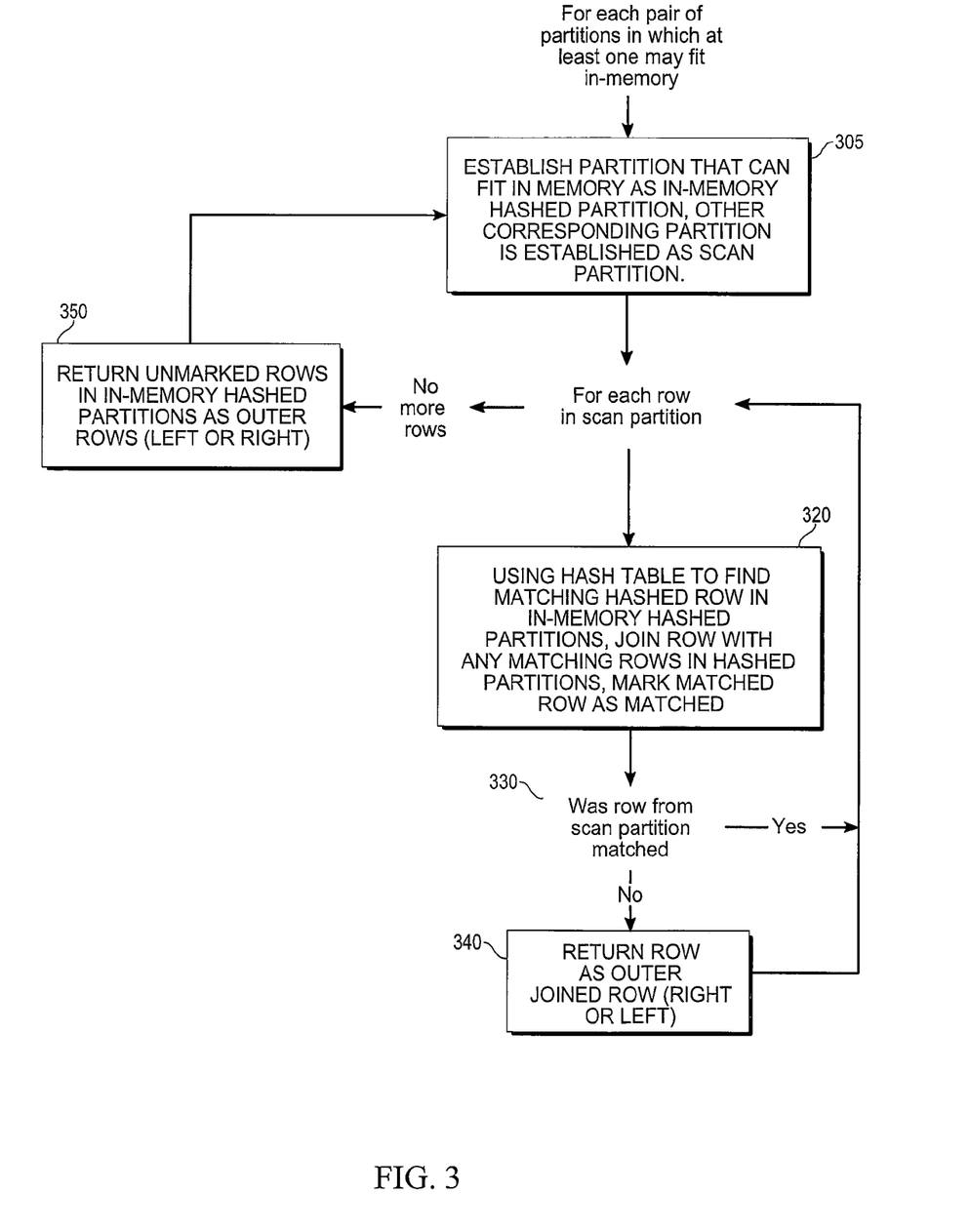
FIG. 3 is a flow chart depicting a procedure used during a hash-based join operation according to an embodiment of the present invention.

FIG. 3 is a flow chart that depicts a procedure for performing a hash-based full partition join, according to an embodiment of the present invention. The procedure performs a hash join between pairs of corresponding partitions if one of them may be completely loaded into memory. For purposes of illustration, P2.T2 may be completely loaded into memory and a hash table indexing the partition based on the respective join column is built (305). Partition P2.T1 is established as the scan partition.

All the rows from scan partition are scanned. For each row scanned, the hash table is used to determine the inner join rows and outer join rows (320). Specifically, using the hash table, it is determined which rows in the hashed in-memory partition (P2.T2) match the row from scanned partition (P2.T1) based on the join column key. For each matching row in hashed memory partition, the row is joined with a row from the scan partition to generate and return an inner joined row. The row in the hashed memory partition is marked as having been joined.

A row from the scan partition may not match any left table row in the hashed in-memory partitions. If it is determined (330) that that the row has not been matched to a row in the hashed in-memory partitions, then a right or left outer joined row is generated (340), depending on whether the scan partition contains right or left table rows. In the current example, the scan partition P2.T1 contains left table rows, so a left outer join row is generated.

Once all rows have been scanned and processed as above, then left or right outer join rows are generated based on the unmarked hashed in-memory partition (350). If the hashed in-memory partition contains right table rows, as in the current example, a right outer joined row is generated for each unmarked row in the hashed in-memory partition. If the hashed in-memory partition contains right table rows, as in the current example, a right outer joined row is generated for each unmarked row in the hashed in-memory partition. Otherwise, a left outer joined row is generated for each unmarked row in the hashed in-memory partition.

Piece-Wise Partition Join

A piece-wise partition join is performed when, for a pair of corresponding partitions, neither may be completely stored in memory as a hashed in-memory partition. A piece-wise partition join comprises two stages. In the first stage, the left table partition is divided into subpartitions which can be completely loaded into available memory as a hashed in-memory "subpartition." For each subpartition, it is determined which rows may be inner joined with a row in the right table and which do not join.

In the second stage, the roles of the tables are switched. The corresponding right table partition is divided into subpartitions which can be completely loaded into available memory as a hashed in-memory partition, and a hash table is built for each subpartition. Outer joined rows for the subpartitioned right table are generated. However, no inner join rows are generated.

Figure 4:
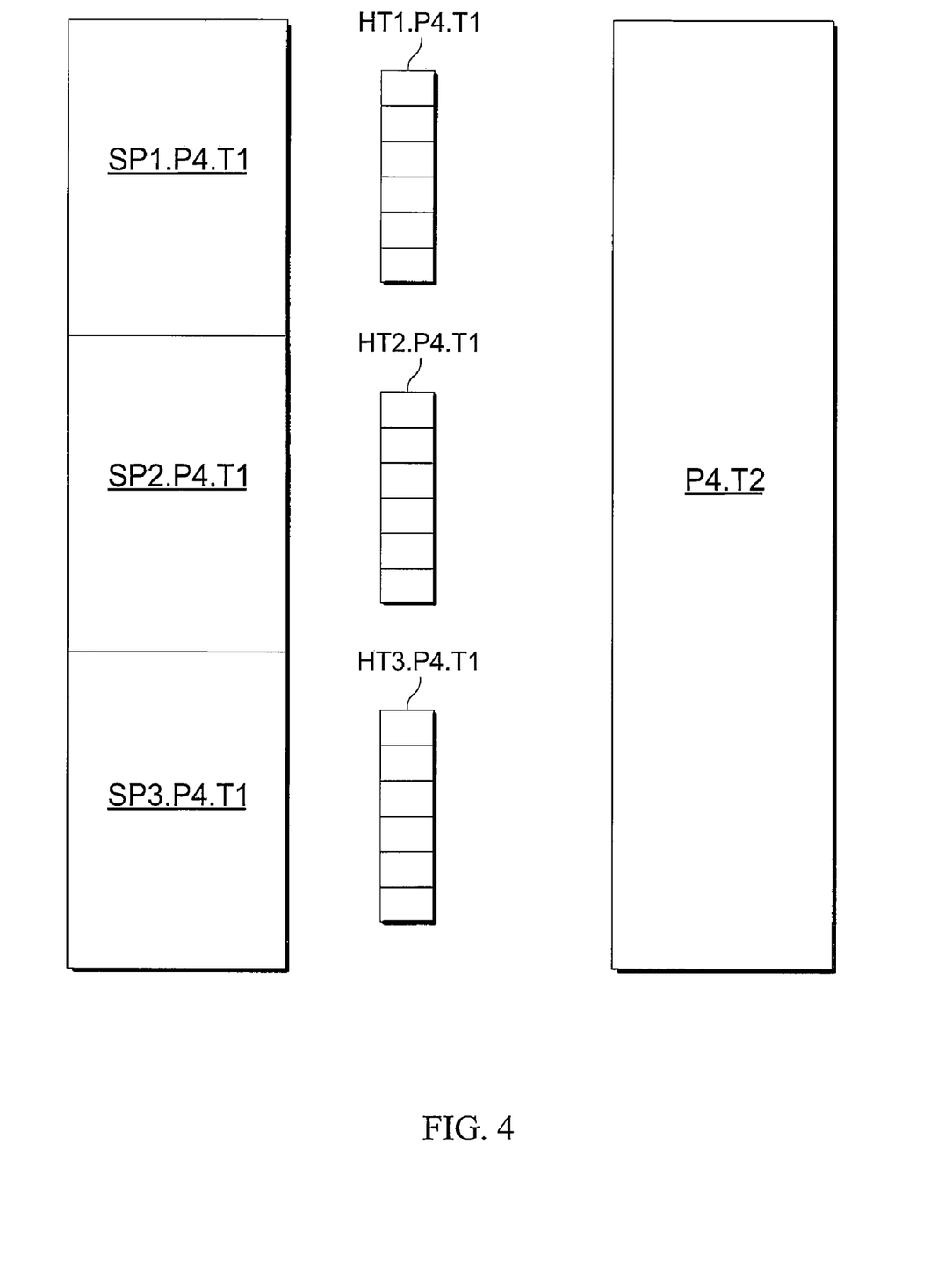
FIG. 4 is a diagram depicting data structures used in a hash-based join operation according to an embodiment of the present invention.

FIG. 4 shows data structures generated for first stage, in which left table partition P4.T1 is divided into subpartitions that may be loaded as hashed in-memory subpartitions. FIG. 4 shows three subpartitions of partition P4.T1, which are SP1.P4.T1, SP2.P4.T1, and SP3.P4.T1. For each subpartition, a hash table is generated that indexes the subpartition based on the join column. Hash tables HT1.P4.T1, HT2.P4.T1, and HT3.P4.T1 are built for SP1.P4.T1, SP2.P4.T1, and SP3.P4.T1, respectively. P4.T2 is the scan partition. In the other stage, right table P4.T2 is divided into subpartitions, and the scan partition is the left table partition P4.T1.

Figure 5:
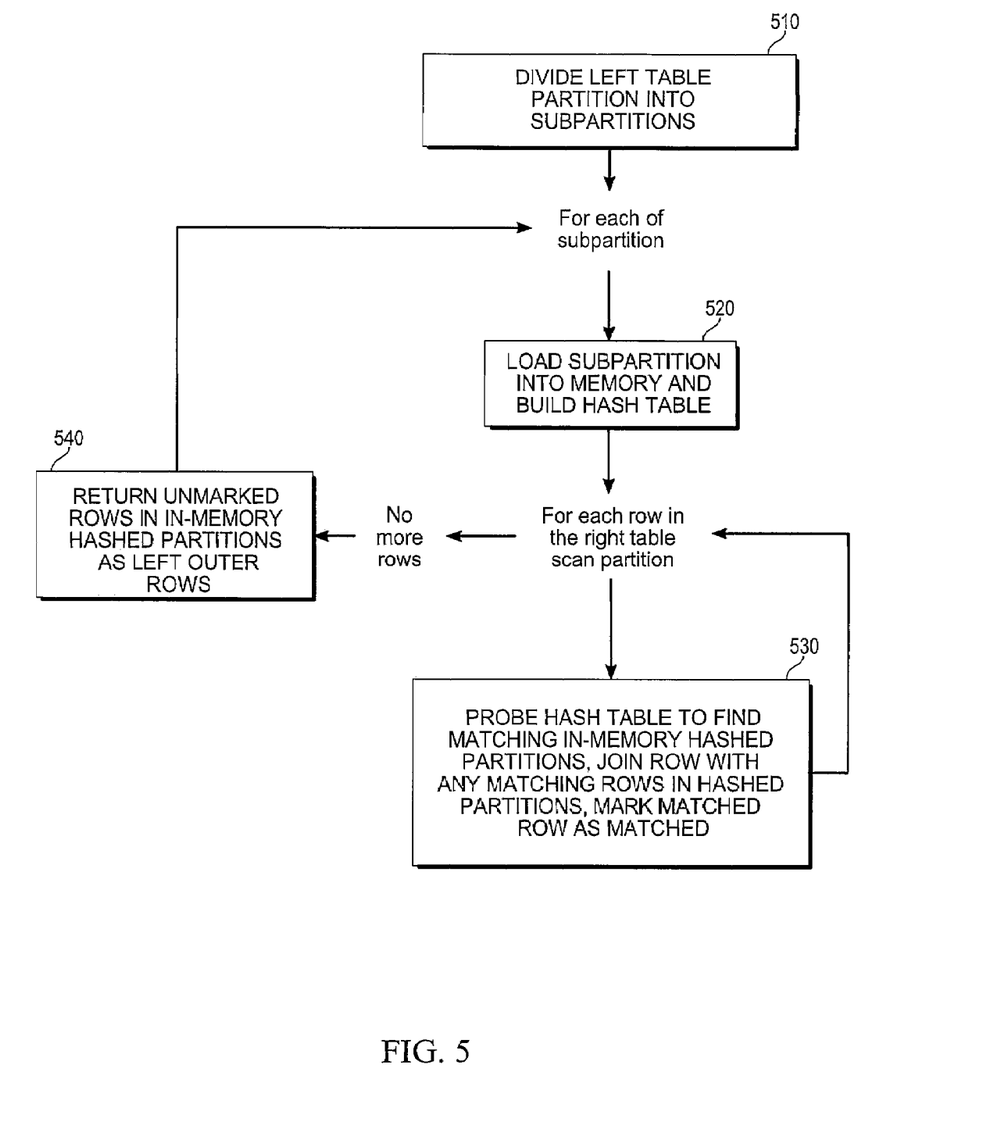
FIG. 5 is a flow chart depicting a procedure used during a hash-based join operation according to an embodiment of the present invention.

FIG. 5 is a flowchart depicting a procedure for performing a piece-wise partition join on a pair of corresponding partitions, according to an embodiment of the present invention. The left partition is divided into subpartitions that may be loaded into available memory as a hashed in-memory subpartition (510). For each subpartition, the subpartition is loaded into memory and a hash table is generated that indexes the subpartition on the respective join column (520).

All the rows from right table scan partition are scanned. For each row scanned, the hash table is probed to find matching left table rows and to generate an inner join row for each matching left table row found. Each matched row in the subpartition is marked as having been joined (530).

A row from the scan partition may not match a row in the hashed in-memory subpartition. However, since all rows in the scan partition have only been compared with a subpartition and not the whole corresponding partition, which could contain matching rows, it cannot be determined whether the unmatched row should be outer joined. This determination is made at the next stage.

Once all rows for the subpartition have been scanned, then left outer join rows are generated. For every unmarked row in the subpartition, a left outer joined row is generated (540).

Figure 6:
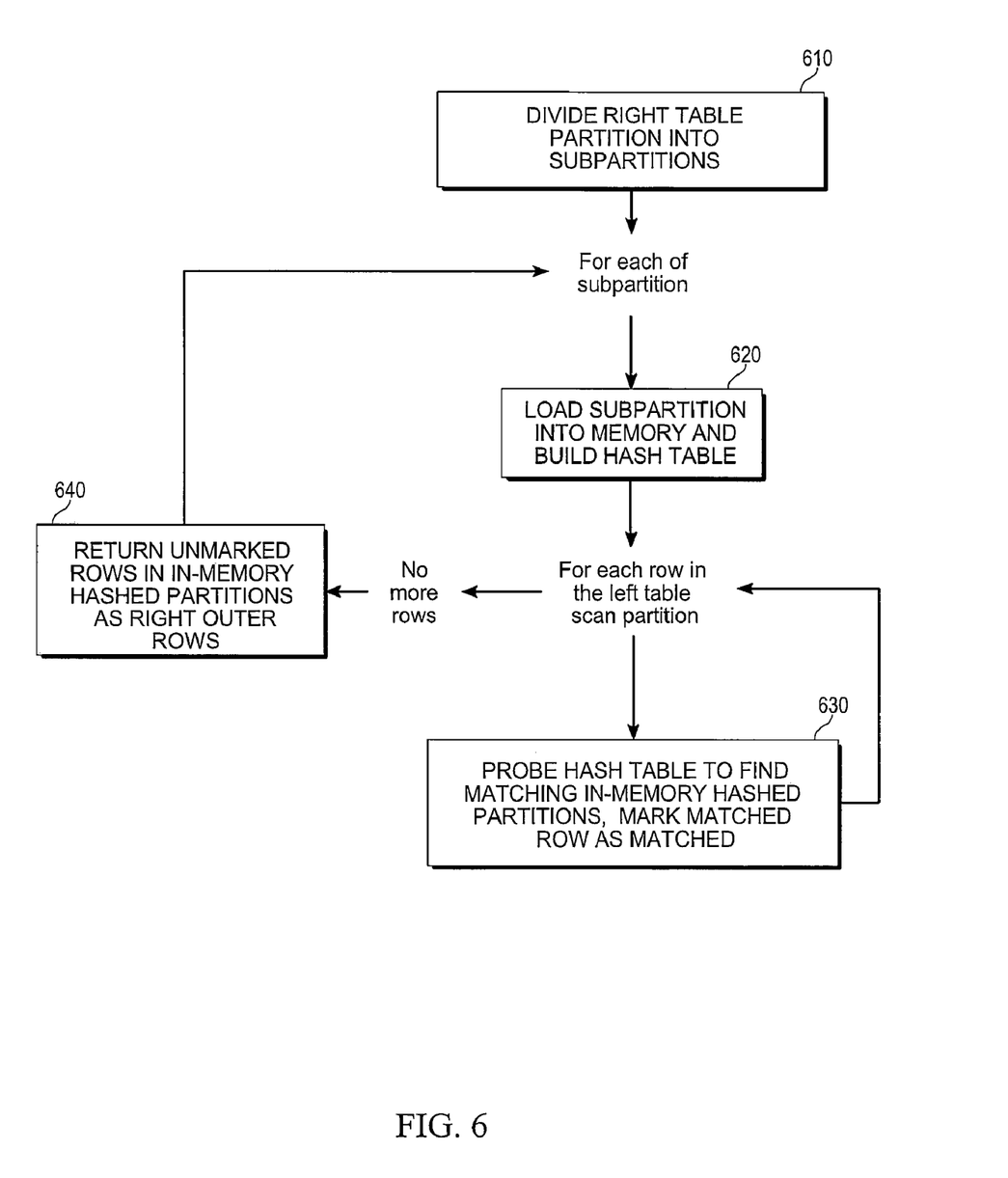
FIG. 6 is a flow chart depicting a procedure used during a hash-based join operation according to an embodiment of the present invention.

FIG. 6 shows a procedure performed in the other stage of the piece-wise partition join, in which the right table is divided into subpartitions.

The right table partition is divided into subpartitions that may be loaded into available memory as hashed in-memory subpartition (610). For each subpartition, the subpartition is loaded into memory and a hash table is generated that indexes the subpartition based on the join column (620).

All the rows from right table scan partition are scanned. For each row scanned, the hash table is probed to find matching left table rows. No inner join rows are generated. Each matched row in the subpartition is marked as having been joined (630).

Once all rows for the subpartition have been scanned, then right outer join rows are generated. For every unmarked row in the subpartition, a right outer joined row is generated (64).

Overview

Figure 7:
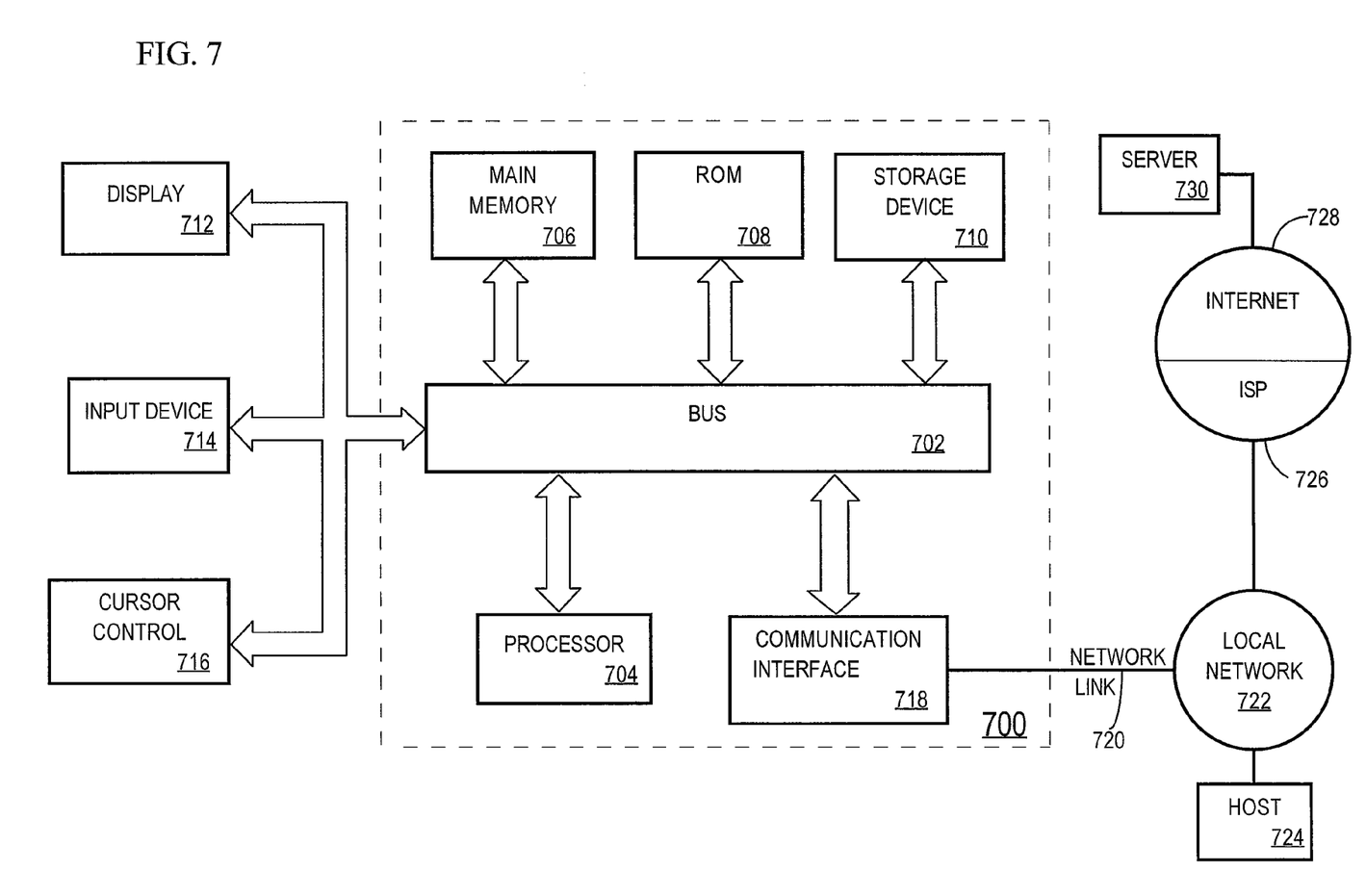
FIG. 7 is a diagram of a computer system that may be used in an embodiment of the present invention.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method used during computation of a full outer join based on a join condition, the method utilizing a computer processor to execute a plurality of steps, comprising:
    partitioning rows from a left table into left table partitions, wherein said partitioning is based on values in a left table join column of said join condition;
    selecting a first subset of said left table partitions;
    generating a hash table that indexes said first subset of left table partitions by the respective join column of said join condition;
    for each right table row of right table rows from a right table,
        (a) probing said hash table to find any particular left table row to inner join with said each right table row based on said join condition,
        (b) for any particular left table row found to inner join with said each right table row, generating an inner join row and marking said particular left table row in said first subset of left table partitions as inner joined,
        (c) determining whether said each right table row was inner joined with any left table row in said first subset of left table partitions, and
        (d) when said each right table row was not inner joined with any particular left table row in said first left table partition, generating a right outer join row for said each right table row; and
    for each left table row in said first subset of left table partitions that is not marked as inner joined, generating a left outer join row.

2. The computer-implemented method of claim 1, wherein selecting a first subset of said left table partitions includes selecting members of said first subset so that said first subset is completely storable within an amount of volatile memory.

3. The computer-implemented method of claim 1, wherein said first subset of left table partitions includes multiple left table partitions.

4. A computer-implemented method used during a computation that is based on a join condition, of a full outer join between a right table and a left table, wherein said join condition is based on a left table join column and a right table join column, the method utilizing a computer processor to execute a plurality of steps, comprising:
    partitioning rows from said left table into left table partitions, wherein said partitioning uses a partitioning procedure based on values in said left join column;
    selecting a first in-memory subset of said left table partitions to store in-memory and a second subset of said left table partitions that does not have to be retained in-memory;
    generating a first hash table that indexes said first in-memory subset of left table partitions by the respective join column of said join condition;
    for each right table row of right table rows from said right table,
        determining based on said partitioning procedure whether said each right table row corresponds said first in-memory subset;
        if said each right table row corresponds to said first in-memory subset, then
            (a) probing said first hash table to find any particular left table row to inner join with said each right table row based on said join condition,
            (b) for any particular left table row to inner join with said each right table row, generating an inner join row and marking said particular left table row in said first subset of left table partitions as inner joined,
            (c) determining whether said each right table row was inner joined with any left table row in said first subset of left table partitions, and
            (d) when said each right table row was not inner joined with any particular left table row in said first subset of left table partitions, generating a right outer join row for said each right table row;
        if said each right table row does not correspond to said first in-memory subset, then storing said each right table row in a right table partition that corresponds to a left table partition of said second subset of left table partitions, wherein said correspondence to a left table partition is based on said partitioning procedure; and
    for each left table row in said first subset of left table partitions that is not marked as inner joined, generating a left outer join row.

5. The method of claim 4, wherein a pair of corresponding partitions includes a right table partition that corresponds to a left table partition, the steps further including:
    determining which one of said pair of corresponding partitions is to be loaded into memory as a hashed in-memory partition, wherein the other of said pair of corresponding partitions is a scan partition;
    generating a second hash table that indexes said hashed in-memory partition by the respective join column of said join condition;
    for each scan partition row from said scan partition,
        (1) probing said second hash table to find any row in the hashed in-memory partition to inner join with said each scan partition row, (2) for any particular row found in the hashed in-memory partition to inner join with said each scan partition row, generating an inner join row and marking said particular row in the hashed in-memory partition as inner joined, (3) determining whether said each scan partition row was inner joined with any row in said hashed in-memory partition, and (4) when said each scan partition row was not inner joined with any row in said hashed in-memory partition, generating a left or right outer join row for said each scan partition row;

for each row in said hashed in-memory partition that is not marked as inner joined, generating a left or right outer join row.

6. The method of claim 4, wherein a certain pair of corresponding partitions includes a right table partition that corresponds to a left table partition, the steps further including:

dividing one partition of said left table partition or right table partition into first subpartitions that load in-memory as a hashed in-memory subpartition;

for each first subpartition of said first subpartitions,
loading said each first subpartition in-memory;
generating a second hash table index that indexes said each first subpartition by the respective join column of said join condition;

for each particular row in the other partition of said left table partition or said right table partition, (1) probing said second hash table to find any row in said each first subpartition to inner join with said each particular row in the other partition, and (2) for any particular row found in said each first subpartition to inner join with said each particular row in the other partition, generating an inner join row and marking said particular row in said each first subpartition as inner joined; and for each row in said each first subpartition that is not marked as inner joined, generating an outer join row.

7. The method of claim 6, further including:

dividing the other partition of said left table partition or right table partition into second subpartitions to load in-memory as a hashed in-memory subpartition;

for each second subpartition of said second subpartitions,
loading said each second subpartition in-memory;
generating a third hash table index that indexes said each second subpartition by the respective join column of said join condition;

for each row in said one partition of said left table partition or said right table partition, (1) probing said third hash table to find any row in said each second subpartition to inner join with said each row in said one partition, and (2) for any particular row found in said each second subpartition to inner join with said each row in said one partition, marking said particular row in said each second subpartition as inner joined; and for each row in said each second subpartition that is not marked as being inner joined, generating an outer join row.

8. The method of claim 4, wherein the first subset of left table partitions includes multiple left table partitions.

9. A machine-readable volatile or non-volatile medium storing one or more sequences of instructions for computation of a full outer join based on a join condition, said one or more instructions, which, when executed by one or more processors, causes the one or more processors to perform steps of:

partitioning rows from a left table into left table partitions, wherein said partitioning is based on values in a left table join column of said join condition;

selecting a first subset of said left table partitions;

generating a hash table that indexes said first subset of left table partitions by the respective join column of said join condition;

for each right table row of right table rows from a right table, (a) probing said hash table to find any particular left table row to inner join with said each right table row based on said join condition, (b) for any particular left table row found to inner join with said each right table row, generating an inner join row and marking said particular left table row in said first subset of left table partitions as inner joined, (c) determining whether said each right table row was inner joined with any left table row in said first subset of left table partitions, and (d) when said each right table row was not inner joined with any particular left table row in said first left table partition, generating a right outer join row for said each right table row; and for each left table row in said first subset of left table partitions that is not marked as inner joined, generating a left outer join row.

10. The machine-readable volatile or non-volatile medium of claim 9, wherein selecting a first subset of said left table partitions includes selecting members of said first subset so that said first subset is completely storable within an amount of volatile memory.

11. The machine-readable volatile or non-volatile medium claim 9, wherein selecting a first subset of said left table partitions includes selecting members of said first subset so that said first subset is completely storable within an amount of volatile memory.

12. A machine-readable volatile or non-volatile medium storing one or more sequences of instructions for a computation that is based on a join condition, of a full outer join between a right table and a left table, wherein said join condition is based on a left table join column and a right table join column, said one or more instructions, which, when executed by one or more processors, causes the one or more processors to perform steps of:

partitioning rows from said left table into left table partitions, wherein said partitioning uses a partitioning procedure based on values in said left join column;

selecting a first in-memory subset of said left table partitions to store in-memory and a second subset of said left table partitions that does not have to be retained in-memory;

generating a first hash table that indexes said first in-memory subset of left table partitions by the respective join column of said join condition;

for each right table row of right table rows from said right table, determining based on said partitioning procedure whether said each right table row corresponds said first in-memory subset;

if said each right table row corresponds to said first in-memory subset, then (a) probing said first hash table to find any particular left table row to inner join with said each right table row based on said join condition, (b) for any particular left table row found to inner join with said each right table row, generating an inner join row and marking said particular left table row in said first subset of left table partitions as inner joined,
(c) determining whether said each right table row was inner joined with any left table row in said first subset of left table partitions, and
(d) when said each right table row was not inner joined with any particular left table row in said first subset of left table partitions, generating a right outer join row for said each right table row;
if said each right table row does not correspond to said first in-memory subset, then storing said each right table row in a right table partition that corresponds to a left table partition of said second subset of left table partitions, wherein said correspondence to a left table partition is based on said partitioning procedure; and
for each left table row in said first subset of left table partitions that is not marked as inner joined, generating a left outer join row.

13. The machine-readable volatile or non-volatile medium of claim 12, the steps further including:
determining which one of said pair of corresponding partitions is to be loaded into memory as a hashed in-memory partition, wherein the other of said pair of corresponding partitions is a scan partition;
generating a second hash table that indexes said hashed in-memory partition by the respective join column of said join condition;
for each scan partition row from said scan partition,
(1) robing said second hash table to find any row in the hashed in-memory partition to inner join with said each scan partition row,
(2) for any particular row found in the hashed in-memory partition to inner join with said each scan partition row, generating an inner join row and marking said particular row in the hashed in-memory partition as inner joined,
(3) determining whether said each scan partition row was inner joined with any row in said hashed in-memory partition, and
(4) when said each scan partition row was not inner joined with any row in said hashed in-memory partition, generating a left or right outer join row for said each scan partition row;
for each row in said hashed in-memory partition that is not marked as inner joined, generating a left or right outer join row.

14. The machine-readable volatile or non-volatile medium of claim 12, wherein a certain pair of corresponding partitions includes a right table partition that corresponds to a left table partition, the steps further including:
dividing one partition of said left table partition or right table partition into first subpartitions to load in-memory as a hashed in-memory subpartition;
for each first subpartition of said first subpartitions,
loading said each first subpartition in-memory;
generating a second hash table index that indexes said each first subpartition by the respective join column of said join condition;
for each particular row in the other partition of said left table partition or said right table partition,
(1) probing said second hash table to find any row in said each first subpartition to inner join with said each particular row in the other partition, and
(2) for any particular row found in said each first subpartition to inner join with said each particular row in the other partition, generating an inner join row and marking said particular row in said each first subpartition as inner joined; and
for each row in said each first subpartition that is not marked as inner joined, generating an outer join row.

15. The machine-readable volatile or non-volatile medium of claim 14, the steps further including:
dividing the other partition of said left table partition or right table partition into second subpartitions to load in-memory as a hashed in-memory subpartition;
for each second subpartition of said second subpartitions,
loading said each second subpartition in-memory;
generating a third hash table index that indexes said each second subpartition by the respective join column of said join condition;
for each row in said one partition of said left table partition or said right table partition,
(1) probing said third hash table to find any row in said each second subpartition to inner join with said each row in said one partition, and
(2) for any particular row found in said each second subpartition to inner join with said each row in said one partition, marking said particular row in said each second subpartition as inner joined; and
for each row in said each second subpartition that is not marked as being inner joined, generating an outer join row.

16. The machine-readable volatile or non-volatile medium of claim 12, wherein the first subset of left table partitions includes multiple left table partitions.

\* \* \* \* \*

UNITED STATES PATENT AND TRADEMARK OFFICE
CERTIFICATE OF CORRECTION

PATENT NO.      : 7,730,055 B2
APPLICATION NO. : 12/144074
DATED           : June 1, 2010
INVENTOR(S)     : Srikanth Bellamkonda et al.

Page 1 of 1

It is certified that error appears in the above-identified patent and that said Letters Patent is hereby corrected as shown below:

In column 5, line 24, before "a" delete "that".

In column 6, line 3, after "that" delete "that".

In column 10, line 33, in claim 4, after "row" insert -- found --.

In column 11, line 20, in claim 6, delete "that" and insert -- to --, therefor.

In column 12, line 33, in claim 11, after "medium" insert -- of --.

In column 13, line 30, in claim 13, delete "robing" and insert -- probing --, therefor.

Signed and Sealed this
Twelfth Day of July, 2011

David J. Kappos
*Director of the United States Patent and Trademark Office*